Figure 1:
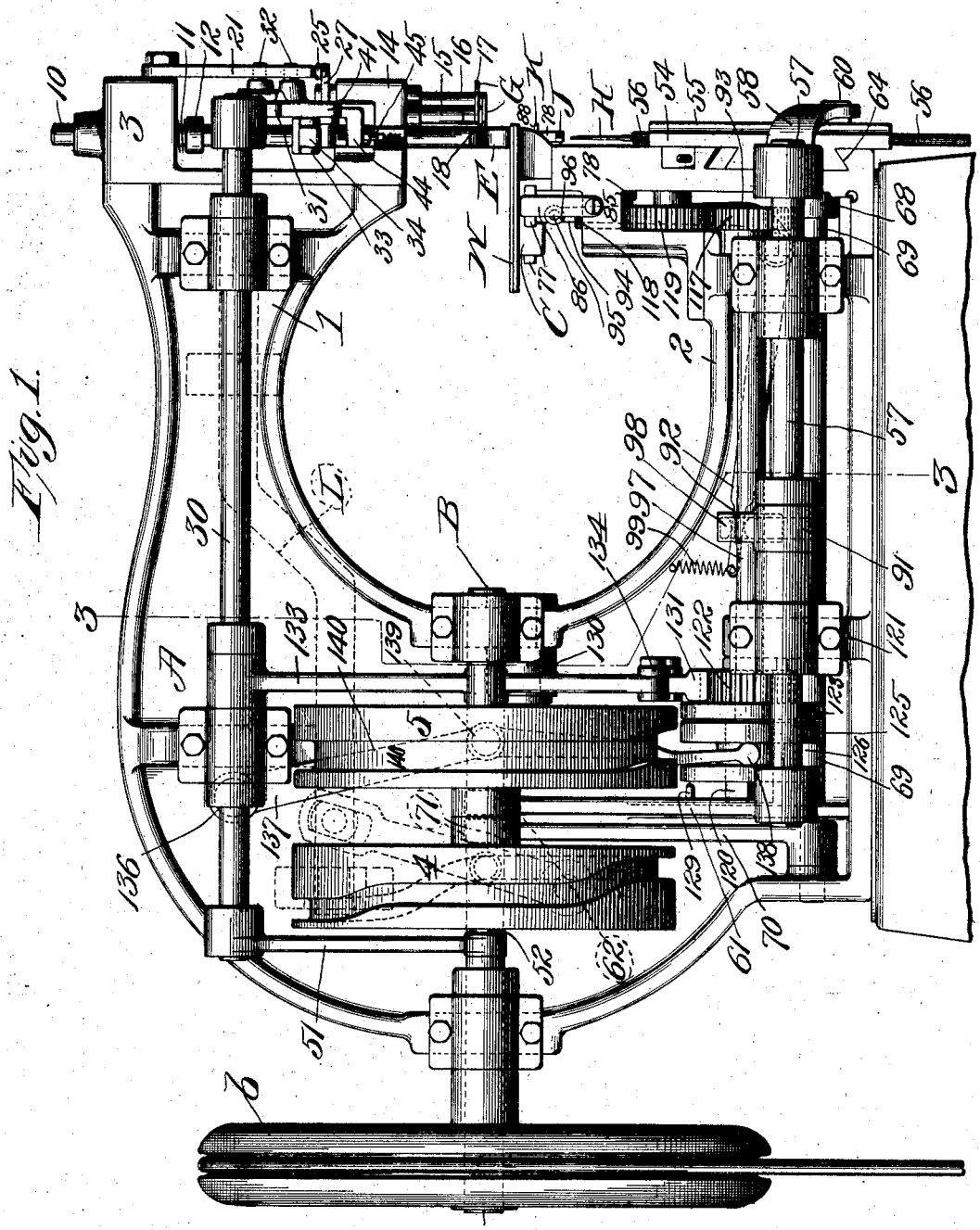

No. 760,732. PATENTED MAY 24, 1904.
G. L. CORCORAN & G. A. DOBYNE.
WAX THREAD SEWING MACHINE.
APPLICATION FILED FEB. 20, 1903.
NO MODEL. 8 SHEETS—SHEET 1.

Witnesses: Inventors:
George L. Corcoran,
George A. Dobyne,
By Bakewell & Cornwall
Attys.

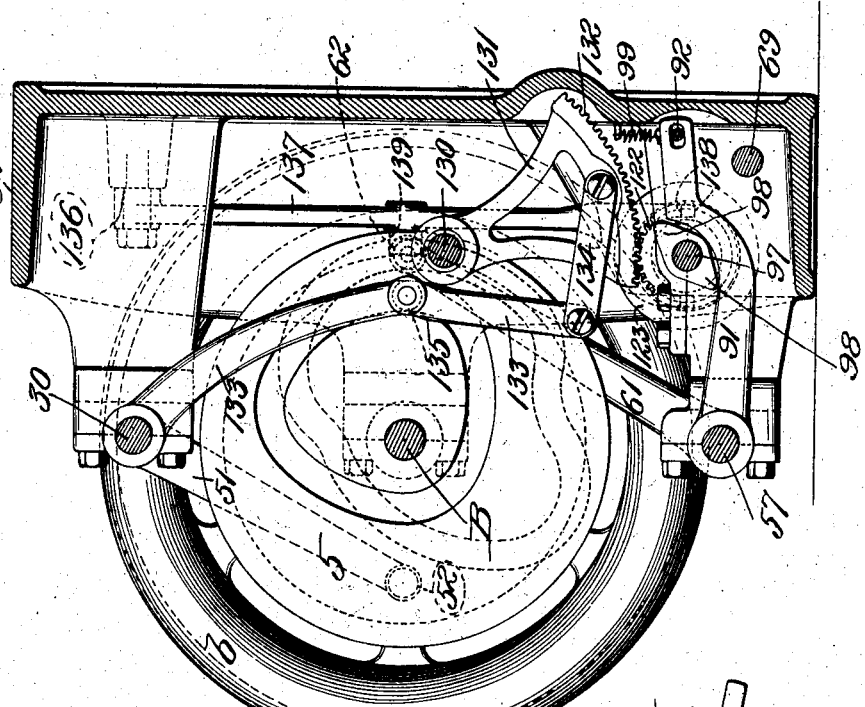

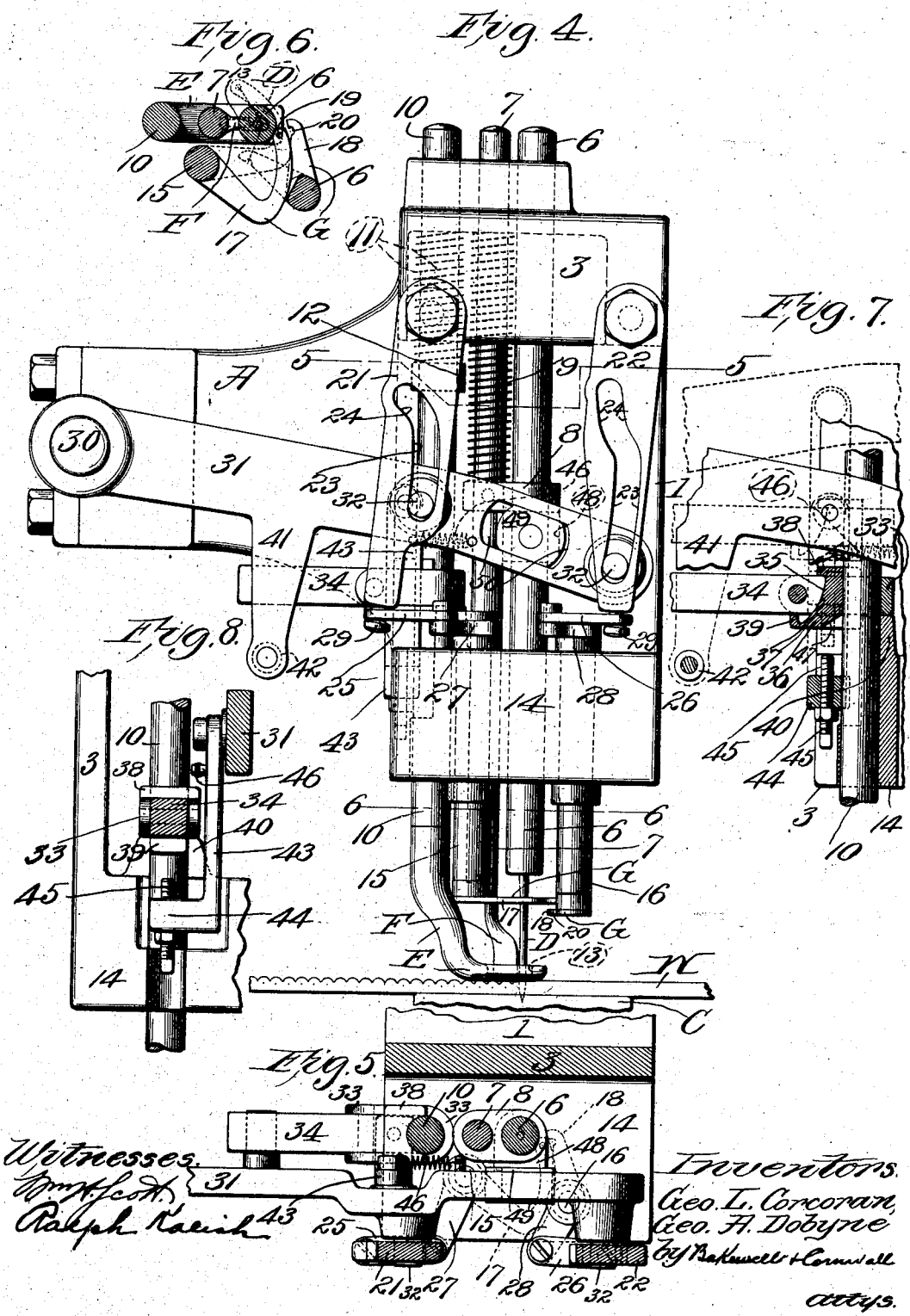

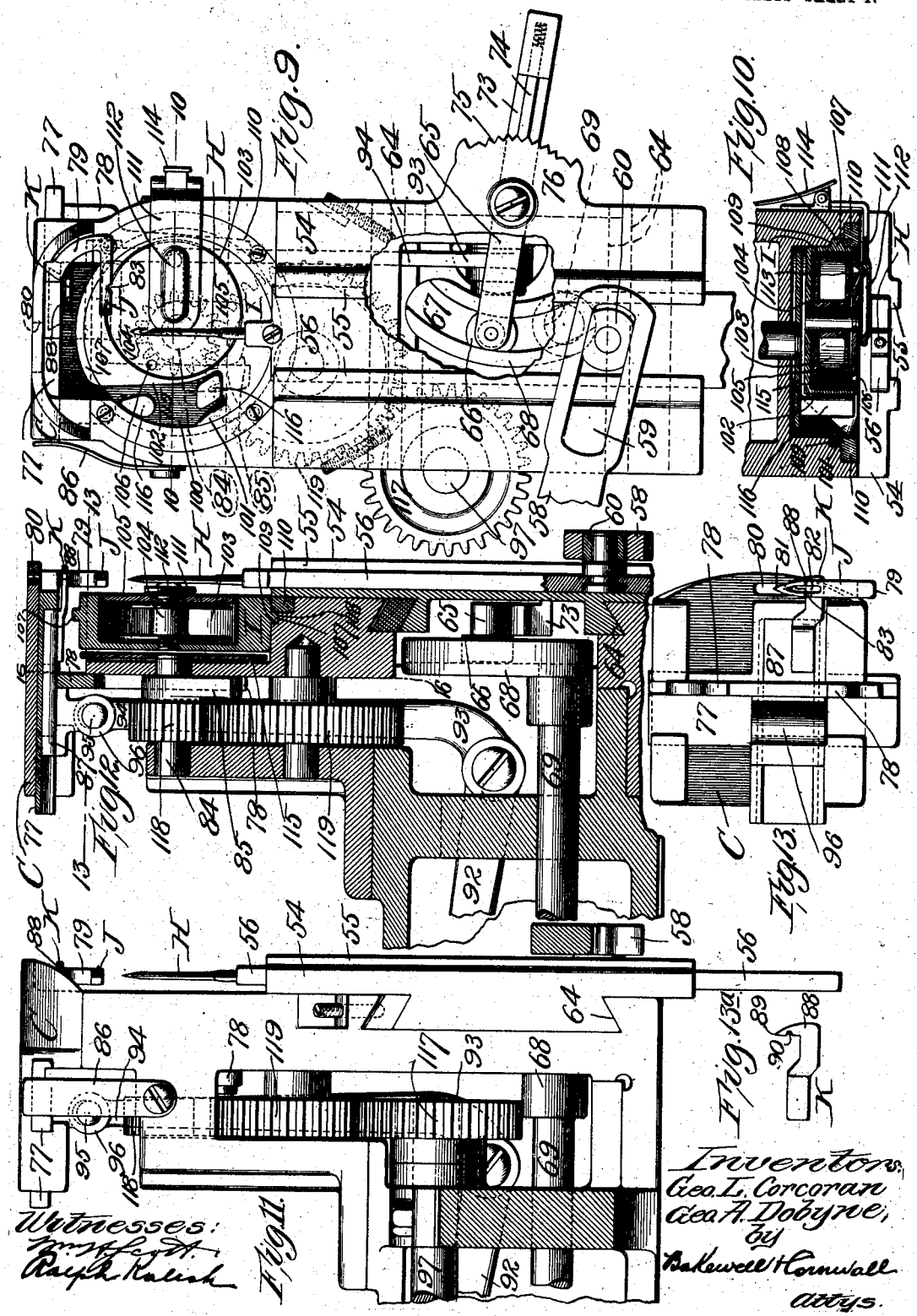

No. 760,732. PATENTED MAY 24, 1904.
G. L. CORCORAN & G. A. DOBYNE.
WAX THREAD SEWING MACHINE.
APPLICATION FILED FEB. 20, 1903.
NO MODEL. 8 SHEETS—SHEET 5.
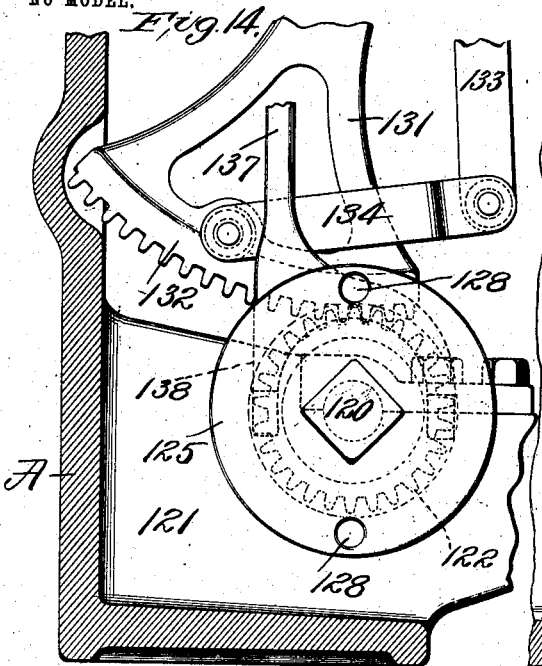
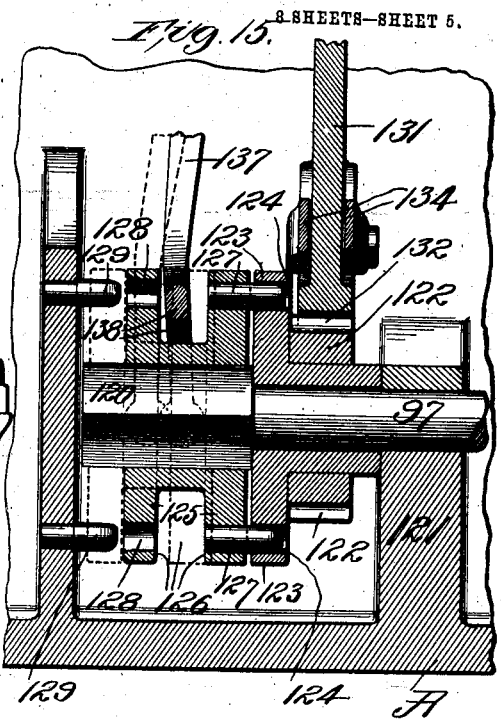

No. 760,732. PATENTED MAY 24, 1904.
G. L. CORCORAN & G. A. DOBYNE.
WAX THREAD SEWING MACHINE.
APPLICATION FILED FEB. 20, 1903.
NO MODEL. 8 SHEETS—SHEET 6.
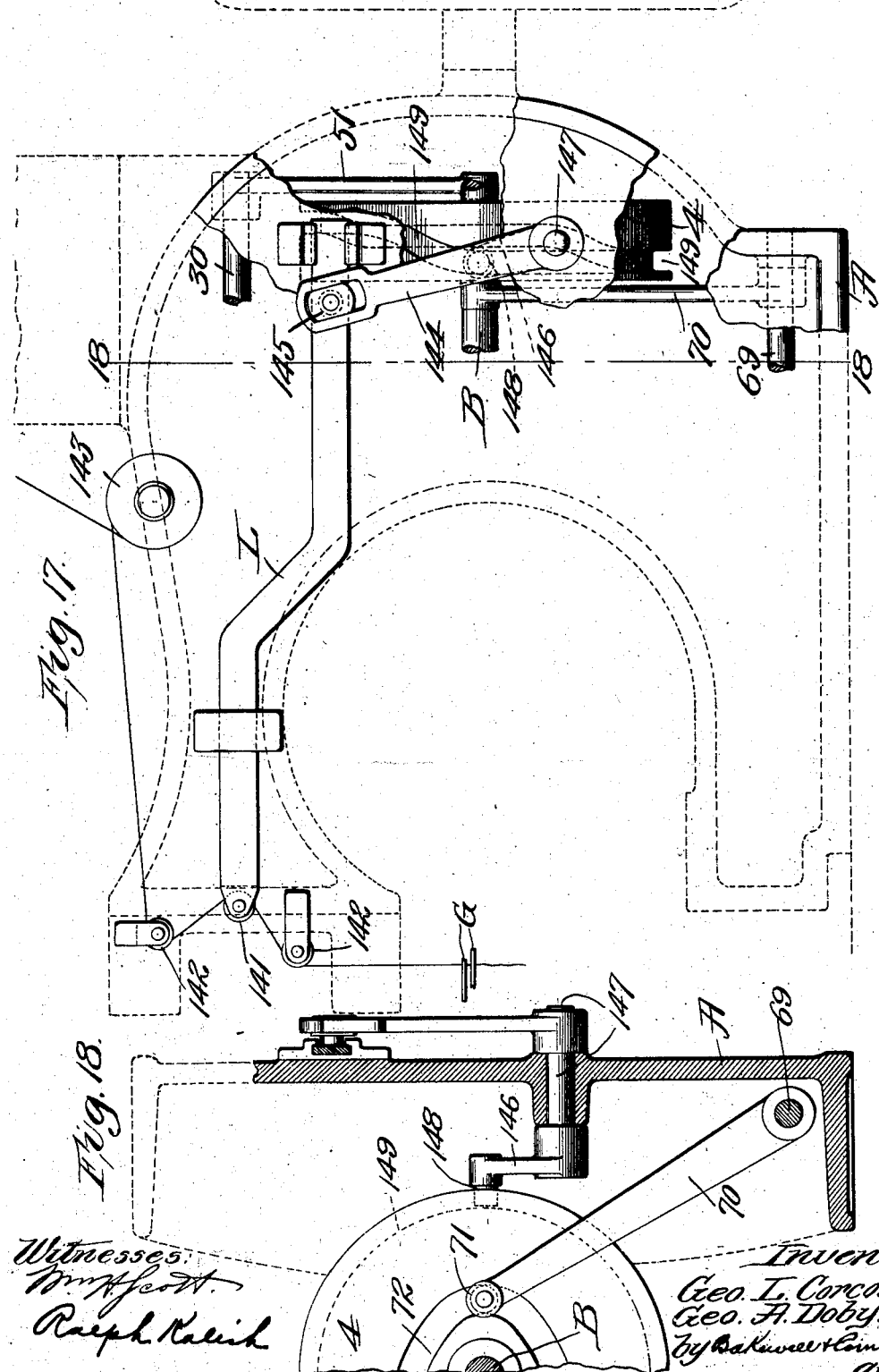

No. 760,732. PATENTED MAY 24, 1904.
G. L. CORCORAN & G. A. DOBYNE.
WAX THREAD SEWING MACHINE.
APPLICATION FILED FEB. 20, 1903.
NO MODEL. 8 SHEETS—SHEET 7.
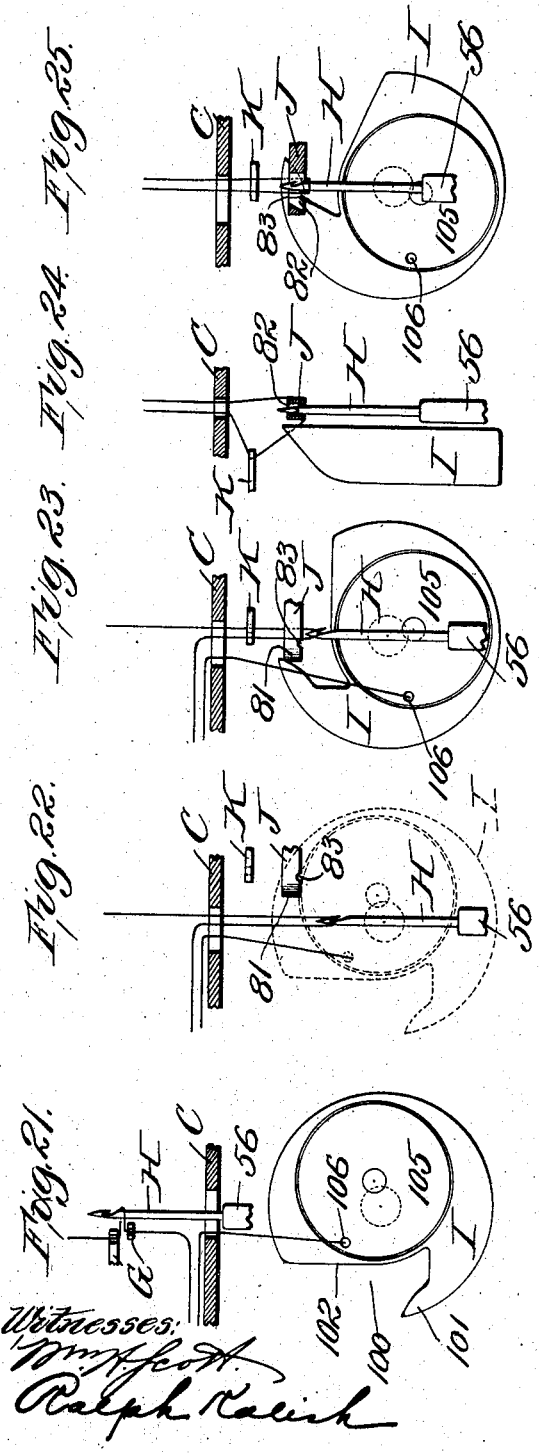
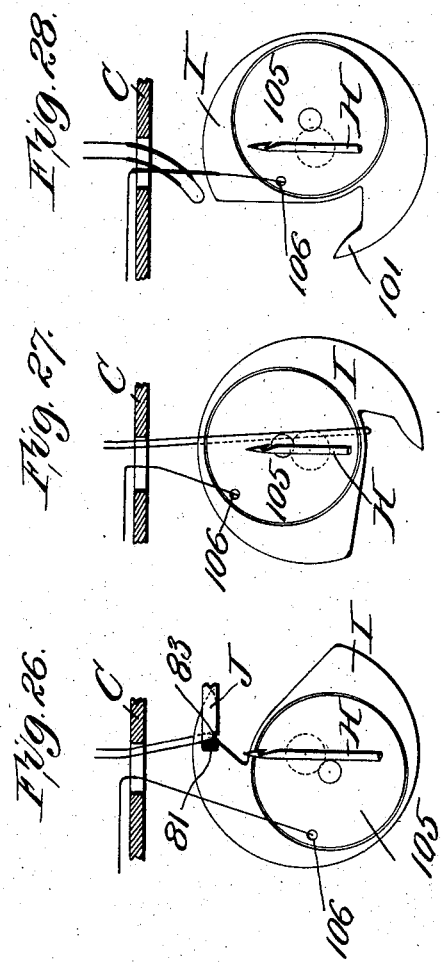

No. 760,732. PATENTED MAY 24, 1904.
G. L. CORCORAN & G. A. DOBYNE.
WAX THREAD SEWING MACHINE.
APPLICATION FILED FEB. 20, 1903.
NO MODEL. 8 SHEETS—SHEET 8.
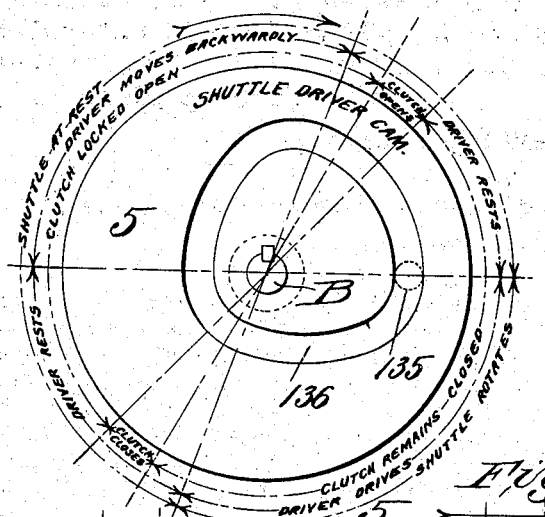
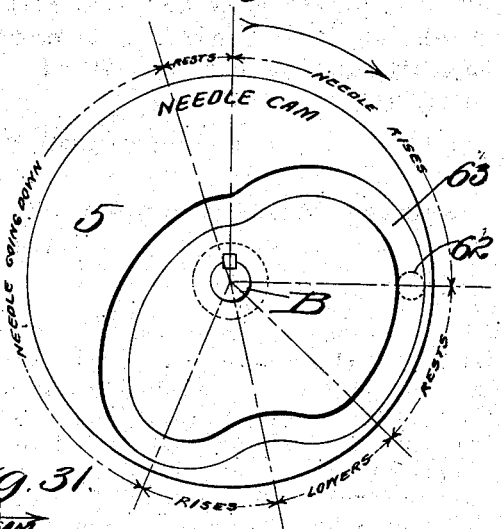
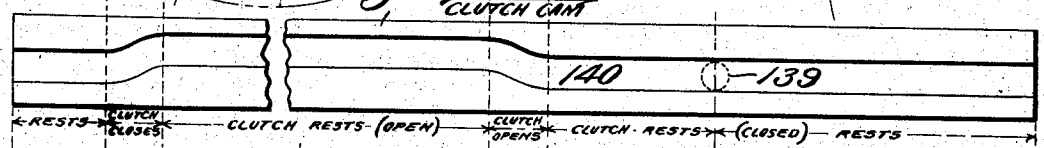
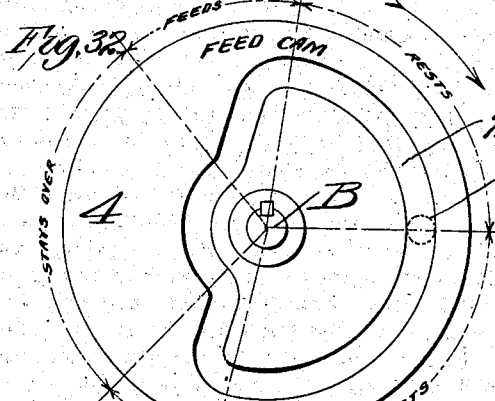
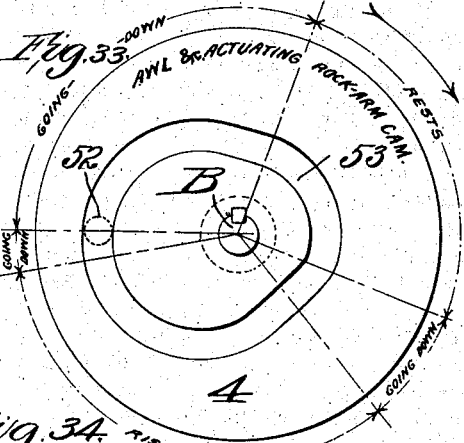
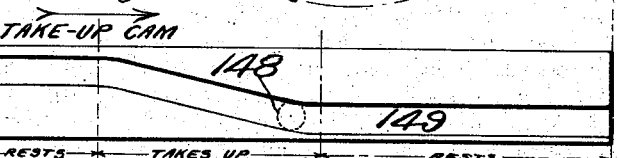
Witnesses:
Inventors
George L. Corcoran,
George A. Dobyne,
by Bakewell & Cornwall
Attys No. 760,732.

Patented May 24, 1904.

UNITED STATES PATENT OFFICE.

GEORGE L. CORCORAN AND GEORGE A. DOBYNE, OF ST. LOUIS, MISSOURI, ASSIGNORS, BY DIRECT AND MESNE ASSIGNMENTS, TO CHAMPION SHOE MACHINERY COMPANY, OF ST. LOUIS, MISSOURI, A CORPORATION OF MISSOURI.

WAX-THREAD SEWING-MACHINE.

SPECIFICATION forming part of Letters Patent No. 760,732, dated May 24, 1904.

Application filed February 20, 1903. Serial No. 144,320. (No model.)

*To all whom it may concern:*

Be it known that we, GEORGE L. CORCORAN and GEORGE A. DOBYNE, citizens of the United States, residing at St. Louis, Missouri, have jointly invented a certain new and useful Improvement in Sewing-Machines, of which the following is a full, clear, and exact description, such as will enable others skilled in the art to which it appertains to make and use the same, reference being had to the accompanying drawings, forming part of this specification, in which—

Figure 1 is a side elevation. Fig. 2 is a front elevation. Fig. 3 is a front elevation, partly in section on about the line 3 3 of Fig. 1. Fig. 4 is an enlarged front elevation of the head of the machine and the parts carried thereby. Fig. 5 is a top plan view partly in section on about the line 5 5 of Fig. 4. Fig. 6 is a top plan view partly in section on about the line 6 6 of Fig. 4. Fig. 7 is a detail view showing a portion of the machine-head, a portion of the presser-bar, the presser-bar-raising clamp, and the means for releasing the same, certain of the parts being shown in section. Fig. 8 is a detail view showing the presser-bar, its raising-clamp, and the means for releasing the same, this view being partly in section and being a side view looking from the left of Fig. 4. Fig. 9 is an enlarged front elevation of the work-table and the parts below the same, certain of the parts illustrated in this figure being broken away. Fig. 10 is a top view, chiefly in section on about the line 10 10 of Fig. 9. Fig. 11 is a side elevation of the portion of the machine shown in Fig. 9, certain parts associated therewith being shown in section. Fig. 12 is a vertical sectional elevation through substantially the vertical central axis of Fig. 9 and looking from the left of said last-mentioned figure. Fig. 13 is an inverted plan view on about the line 13 13 of Fig. 12, the depending projections upon the movable plate which carries the loop-enterer and "take-off" being shown in full. Fig. 13ª is a detail bottom view of the loop-spreader. Fig 14 is an enlarged detail view, in front elevation, of the shuttle-actuating mechanism. Fig. 15 is a sectional elevation of said mechanism looking from the right of Fig. 14 and taken on about the central vertical axis of the rotatable clutch. Fig. 16 is a detail front view, partly in section on about the line 16 16 of Fig. 12. Fig. 17 is a side elevation illustrating the take-up and showing the side of the machine opposite to that shown in Fig. 1, the supporting-standards being illustrated diagrammatically and being shown as partly broken away. Fig. 18 is a fragmentary detail view on about the line 18 18 of Fig. 17 looking from the left of said last-mentioned figure. Figs. 19 and 20 are diagrammatic views illustrative of the movements of the needle, the presser-foot, the awl, the stitch-indenting tool, and the thread-laying devices, Fig. 19 showing in full lines the parts in the positions they occupy when the needle is ready to feed the work, the dotted lines indicating the positions of the needle, the presser-foot, and the thread-laying devices after the work has been fed and before the needle has commenced to descend, and Fig. 20 illustrating the positions of the parts after the work has been fed and while the needle is descending. Figs. 21 to 28 are diagrammatic views illustrating the formation of the stitch, Fig. 24 being in side elevation and the remaining figures being in front elevation. Fig. 29 illustrates the cam which controls the shuttle-driver, certain information relating to the shuttle and to the shuttle-controlling clutch being indicated in this figure. Fig. 30 illustrates the cam which controls the vertical reciprocations of the needle. Fig. 31 is a development of the cam which controls the shuttle-controlling clutch. Fig. 32 illustrates the cam which controls the feeding movements of the needle. Fig. 33 illustrates the cam which controls the arm by means of which the awl, the stitch-indenting tool, the presser-foot, and the thread-laying devices are operated; and Fig. 34 illustrates the development of the cam which controls the take-up.

Our invention relates to improvements in sewing-machines, the present machine being particularly designed for sewing wax-thread; but the machine is in no wise limited to such use.

Our object is to provide an improved and efficient machine of the character indicated.

To this end our invention consists in the various matters hereinafter described and claimed.

We have herein illustrated and described the shuttle-actuating mechanism and the presser-bar-actuating mechanism; but claims to these subjects-matter are not herein made, as the shuttle-actuating mechanism forms the basis of our application, Serial No. 144,318, filed February 20, 1903, and the presser-bar-actuating mechanism forms the basis of our Patent No. 751,263, granted February 2, 1904, the application for said patent having been filed February 20, 1903.

Referring now more particularly to the drawings, A indicates the supporting-standard, which has upper and lower extensions 1 and 2, respectively, between which the work is adapted to be placed, a head 3 being secured to the upper extension 1 and the work-table and certain of the operating parts being connected to the front of the lower extension 2.

B indicates the driving-shaft, here shown as provided with a pulley b, and C indicates the work-table.

D represents the awl; E, the presser-foot; F, the stitch-indenting tool, and G the devices for laying the thread across the needle to enable the same to be caught by the barb.

H indicates the needle, and I refers to the shuttle.

J is a member which enters the loop to primarily spread the same and also serves to carry the loop from the needle, (we shall for convenience herein term this device the "loop-carrier" or "take-off,") and K indicates the loop-spreader.

L indicates the take-up.

In Figs. 1, 2, 4, and 9 the parts are illustrated in what may be termed their "positions of rest"—i. e., the positions assumed by them after the completion of a cycle of operations. Assuming that the work W is upon the work-table, and referring to Figs. 19 and 20 in connection with the figures just above indicated, as the shaft B commences to rotate the awl descends slightly and then commences to rise, the stitch-indenting tool rising with the awl, the needle commencing to rise and the take-up moving backwardly in order to take up the loop of the last stitch and to measure off the thread for the stitch about to be formed. As the needle about reaches the end of its upward movement the presser-foot rises. Fig. 19 shows in full lines the parts in the positions just indicated. The needle shifts horizontally in order to feed the work, the needle moving forwardly into position under the stitch-indenting tool. The presser-foot then falls, and while the needle is in its projected position through the work the thread-laying devices move to lay the thread in position to be engaged by the barb as the needle descends, the take-up moving forwardly during the thread-laying movement of the thread-laying devices in order to pay out sufficient thread to form one side of the open loop, which will be produced in the manner hereinafter described. The dotted lines of Fig. 19 indicate the positions occupied by the needle, the presser-foot, the thread-laying devices, and the two threads as the needle is about to descend. The needle then descends and engages what we shall term the "upper" thread, the thread-laying devices moving into normal position and the take-up moving forwardly to pay out sufficient thread to permit the formation of the open loop without pulling the thread across the needle, and after the needle has descended to a point below the loop take-off J this loop take-off enters the loop, the loop-spreader K entering said loop at the same time, Fig. 23 illustrating the parts in the positions just indicated. The needle then rises slightly and the loop-spreader moves into open position, the upward movement of the needle being sufficient to carry its barb into a slot in the loop-carrier or take-off, and the loop-spreader not only spreading the loop to permit the entrance of the point of the shuttle, but also laying the loop across the under side of the loop-carrier, as shown in Fig. 24. The shuttle has meanwhile started to rotate and its point enters the open loop, as shown in Fig. 25. The loop-spreader closes, the loop-carrier recedes in order to carry the loop away from the needle, and the needle descends free of the upper thread, as shown in Fig. 26. The needle continues to descend until it reaches its lowermost position and moves backwardly into position ready to again pierce the work, while the shuttle rotates, as shown in Fig. 27, and comes to rest in the position shown in Fig. 28. The take-up has meanwhile paid out sufficient thread to permit the loop to be carried around by the shuttle and then recedes in order to take up the loop which has caught the bobbin or under thread in a manner which will be readily understood, Fig. 28 showing the loop before it has been drawn taut. As the take-up completes its loop-drawing movement the awl and the stitch-indenting tool descend, the stitch-indenting tool operating over the stitch whose formation has been above described and the awl piercing the work preparatory to the formation of the stitch next following that whose formation has just been described.

For convenience of description we have referred to the thread which is engaged by the needle as the "upper" thread and to the thread from the bobbin as the "lower" thread, and we shall hereinafter refer to these threads by such terms. We do not, however, mean to imply by these terms that the thread engaged by the needle is necessarily above the bobbin-thread or that the so-called "lower" thread is necessarily below the so-called "upper" thread.

The general organization and operation of the machine being understood, we shall describe its construction and operation more in detail.

Upon the main shaft B are cam-disks 4 and 5, and it is by means of these that power is transmitted to the operative elements of the machine.

The awl-bar 6 is supported in the head 3 to reciprocate vertically, the awl D being secured to said bar in any convenient manner. The stitch-indenting tool-bar 7 is also supported in the head 3 to reciprocate vertically, and upon the said bar is fixed a plate 8, which is provided with an opening through which the awl-bar is slidable, a spring 9 coiled about the stitch-indenting tool-bar lying between the said plate 8 and a suitable portion of the head. This plate 8 is, in effect, a double collar encircling both the awl-bar and the stitch-indenting tool-bar. The stitch-indenting tool F is secured to its bar in any suitable manner. The presser-bar 10, parallel with the awl-bar and the stitch-indenting tool-bar, is also supported in the head 3 to reciprocate vertically and is yieldingly held in lowermost position upon the work, as by means of a spring 11, coiled about said pressure-bar and lying between a collar 12 upon said bar and some suitable portion of the machine-head. The presser-foot E is secured to its bar in any suitable manner and has a slot 13, through which the awl and the stitch-indenting tool are adapted to operate, the needle also being adapted to extend into said slot and to move therein in order to feed the work. The stitch-indenting tool is a member separate from the presser-foot or any other part of the machine, being an independent member, and its operation, adjustment, and repair can therefore be effected without interference by other parts, as results when the stitch-indenting tool is a part of the presser-foot. The location of the stitch-indenting tool and the general arrangement and operation of the devices permits this stitch-indenting tool to operate upon a finished stitch at the distance of only one stitch behind the point at which the awl and needle pierce the work and directly over the stitch to be operated upon, whereby even when the work is being turned or otherwise thrown out of a straight line the stitch-indenting tool descends into the line in which the stitch to be operated upon was formed, thus producing a neat and satisfactory finish. In those instances in which the stitch-indenting tool operates some distance from the stitch being formed it not infrequently happens that the stitch-indenting tool operates entirely outside of the line including the stitch.

*The thread-laying devices.*—Journaled in the lower portion 14 of the head 3 are vertical oscillatory shafts 15 and 16, each of which carries a horizontal arm 17 and 18, respectively, the arm 17 lying above the arm 18 and being provided with a thread-eye 19. The arm 18 in its edge adjacent the thread-eye of the said arm 17 when the parts are in normal position is provided with a notch 20. The upper thread x passes through the said eye 19, so that the arm 17 is a thread-carrier, and in the normal position of the parts, as shown by full lines in Fig. 6, this thread-carrier and the coöperating arm 18 lie out of the way of the awl, the stitch-indenting tool, and the presser-foot and said thread-carrier holds the thread out of the way of said parts, the arm 18 being held in a position which may be termed in rear of the upper thread and out of engagement therewith. Pivoted to the head of the machine are levers or rock-plates 21 and 22, each of which is provided with a slot having what may be termed a "concentric" portion 23 and an "eccentric" portion 24. These levers or rock-plates have at their lower ends substantially universal connection with links 25 and 26, which are respectively pivoted to crank-arms 27 and 28 upon the oscillatory shafts 15 and 16, the connection between a link and rock-plate being here shown as produced by a pin 29 extending into the rock-plate, the link being loosely pivoted upon said pin. Journaled upon the standard is a horizontal rock-shaft 30, which carries upon its forward end a rock-arm 31, and upon said rock-arm are studs or pins 32, which respectively enter the slots in the rock-plates, the concentric portions 23 of said slots being concentric with the axis of rotation of said shaft. In what may be termed its normal inoperative position the rock-arm lies in almost lowermost position with its studs in the lower portions of the concentric portions of the slots in the rock-plates. As the rock-arm is rocked upwardly the studs move idly in the concentric portions of the rock-plate slots and then engage the eccentric portions of said slots, whereby said rock-plates are rocked, the rock-plate 22 rocking slightly in advance of the plate 21. As these plates rock the oscillatory shafts 15 and 16 are moved about their axes, the shaft 16 moving first, whereby the thread-spreading arm 18 first engages the upper thread in its notch 20, and said arm and the thread-carrier 17 then move oppositely across the vertical plane including the needle (which has been raised) in order to lay the thread upon the needle, as shown by dotted lines in Fig. 6, the thread being laid under the barb, as shown by dotted lines in Fig. 19. As the rock-arm rocks downwardly the thread-laying devices are returned to their normal positions. (Indicated by full lines in Fig. 6.)

*The presser-bar raising and releasing mech-*

*anism.*—About the presser-bar is a yoke or bail 33, between whose arms is pivoted a lifting-bar 34, whose inner end is provided with a cam or eccentric surface 35. Between the presser-bar and the inner end of said lifting-bar and upon the side of the presser-bar opposite to that engaged by the said yoke is a block 36, whose lifting-bar-engaging surface 37 preferably conforms to the said cam-surface 35. The upper portion of said block is preferably provided with overhanging edges 38, which rest upon the arms of the bail and also upon the lifting-bar, whereby said block is supported, and extending from the lower portion of said block and upon the side of the pivotal center of the lifting-bar opposite that upon which the inner end of said bar lies is a stop or rest 39, the lifting-bar when in its releasing position coming to rest between the said stop 39 and the overhanging lip 38, whereby the downward movement of the free end of the lifting-bar about its pivot is limited. The bail 33 normally rests upon some suitable portion, as 40, of the head 3.

Depending from the rock-arm 31 is an arm 41, which carries a projection 42, (preferably a roller,) lying under and adapted at certain times to engage the under surface of the outer portion of said lifting-bar 34, while also depending from the rock-arm 31 is a pivoted arm 43, which has a lower angular extension 44, provided with a member, preferably an adjustable set pin or screw 45, lying below and in line with the block 36. The arm 43 is preferably held in its desired position engaging the presser-bar, in order to be guided thereby, by a spring 46, connected to said arm and to the rock-arm 31. As the rock-arm rises the roller 42 engages the lifting-bar 34, and as it rocks said lifting-bar about its pivot the presser-bar is clamped between the bail and the block 36, whereby in the further upward rocking of said rock-arm 31 the presser-bar is lifted in a manner which will be apparent. The releasing-arm 43 is farther from the center of oscillation of the rock-arm 31 than is the locking-arm 41, whereby for the same amount of movement of the rock-arm 31 the releasing-arm 43 travels a greater distance than does the locking-arm 41. Thus at the desired point in the upward movement of the rock-arm 31 the screw or pin 45 engages the block 36, (preferably upon an inclined surface 47,) and thus lifts the said block and releases the presser-bar, whereupon the spring 11 forces the presser-bar downwardly.

*The general operation of the rock-arm 31 and of the parts controlled thereby.*—We have previously explained the operative connections between the rock-arm 31 and the thread-laying devices and between said rock-arm and the presser-bar and we have also stated that the plate 8, connected to the stitch-indenting tool-bar, has an opening through which the awl-bar passes. Upon the awl-bar below the plate 8 is an abutment 48, to which is pivotally connected a block 49, which lies and operates in a slot 50 in the said rock-arm 31, so that as the said rock-arm rises the awl-bar is elevated by means of the engagement between the said block 49 and the said rock-arm, and, furthermore, during the upward movement of the rock-arm the abutment 48 engages the under surface of the plate 8, and thus elevates the stitch-indenting tool against the force of the spring 9. As the rock-arm descends the awl is positively lowered, and the spring 9 forces the stitch-indenting tool into lowermost position in engagement with the work, the described connection between the stitch-indenting tool-bar and the awl-bar insuring the elevation of the stitch-indenting tool, but permitting the awl to have its full movement notwithstanding the fact that because of the thickness of the work the stitch-indenting tool may come to rest in a relatively high position. At the rear end of the rock-shaft 30 is a second rock-arm, 51, whose free end is provided with a cam-roll 52, entering the cam-groove 53 in one face of the cam-disk 4, this cam-groove being shown most clearly in Fig. 33. With the parts in what we have termed their "normal" positions, as shown in Fig. 4, the said cam-roll 52 rests in the portion of the cam-groove 53 in which said roll is shown by dotted lines in Fig. 33. As the cam starts the arm 31 is rocked downwardly slightly in order to complete the piercing movement of the awl, the studs 32 moving idly in the rock-plate slots, the roller 42 moving idly away from the lifting-bar 34, and the abutment 48 moving idly away from the plate 8. The cam-disk 4 continuing to rotate, the rock-arm 31 is moved upwardly, thus raising the awl-bar, raising the stitch-indenting tool-bar, and carrying the roll 42 closer to the lifting-bar 34, (the needle meanwhile being projected upwardly through the work in a manner to be hereinafter described,) and when near the upper portion of its movement the rock-arm, through the studs 32, serves to rock the rock-plates 21 and 22 to lay the thread about the needle, clamps and elevates the presser-bar, and then releases the said bar, the presser-bar being raised during the time that the needle is shifting to feed the work and being released and lowered as soon as the work has been fed. The rock-arm 31 is then lowered sufficiently to bring the studs 32 again into the concentric portions of the slots in the rock-plates, such movement serving to rock said rock-plates into normal positions, and thus restore the thread-laying devices to their normal positions, this partial downward movement of the rock-arm merely moving the roller 42 idly away from the lifting-bar 34 and permitting only such slight downward movement of the awl-bar and the stitch-indenting tool-bar that they are still held in elevated position out of interference with the needle. The rock-arm 31 then rests in its partially-elevated position in order to give time for the needle to descend, for the shuttle to carry the loop around the bobbin-thread, and for the take-up to draw the needle-thread taut, whereupon the rock-arm 31 completes its downward movement to normal position, as shown in Fig. 4, thus lowering the awl to cause the latter to pierce the work for a new stitch, permitting the stitch-indenting tool to fall, moving its studs 32 idly with respect to the rock-plates 21 and 22, and moving the roller 42 idly away from the lifting-bar 34.

*The needle-operating mechanism.*—In the present organization the needle H has reciprocation in each of two lines which are substantially at right angles to each other, the reciprocations of the needle through the work causing the needle to perform its proper functions in the formation of the stitch and the reciprocations of the needle in its other line of movement being concerned with the feeding of the work.

A plate 54 at the front of the supporting-standard and located below the work-table is provided with suitable guides 55, between which is a needle plate or bar 56, adapted to reciprocate vertically, the needle being secured upon said bar in any suitable manner. When in what may be termed its "normal" position, the needle lies substantially in vertical alinement with the awl, so that as the needle rises it passes through the hole in the work produced by said awl. Suitably journaled upon the standard is a rock-shaft 57, whose forward end is provided with a rock-arm 58, an elongated slot 59 being formed in the free end of said rock-arm and receiving a block 60, pivoted upon the said needle-bar. The slot 59 is of sufficient length to permit the hereinafter-described movements of the plate 54 for the purpose of feeding the work, said movements being in a line at substantially right angles to the vertical reciprocation of the needle-bar. The rear end of the rock-shaft 57 is provided with a rock-arm 61, which carries a cam-roll 62, received in the cam-groove 63 of the cam-disk 5, said groove being shown most clearly in Fig. 30. Bearing in mind the previously-described general operation of the machine and referring to said Fig. 30, it will be seen that as the machine starts from what we have termed its "normal" position the needle rises and then remains in elevated position for a short time, then descends, then rises slightly, and finally descends to its lowermost position, in which it remains until ready to commence a new cycle of movements.

The horizontal reciprocations of the needle are now to be considered. The before-mentioned plate 54 is horizontally slidable upon its supporting-standard, said plate conveniently having a dovetail connection with said standard, as shown at 64. Pivotally (and preferably removably) supported upon said shifting-plate 54 is an arm 65, which is adjustable about its pivot and is provided at what may be termed its "forward" end with a block 66, adapted to enter a curved groove 67 in the outer face of a rock-arm 68 upon a rock-shaft 69, said rock-shaft being horizontal and suitably journaled upon the supporting-standard. Upon the rear portion of said rock-shaft 69 is a rock-arm 70, provided with a cam-roll 71, which is received in a cam-groove 72 in the cam-disk 4, said cam-groove being shown most clearly in Fig. 32. Bearing in mind the general operation of the machine and referring to said Fig. 32, it will be seen that starting from what we have termed the "normal" position of the machine during the first portion of movement of the cam-disk 4 the rock-shaft 69 and the shifting-plate 54 remain inactive. The said shifting-plate is then quickly moved forward, remains in this forward position for a time, then quickly returns to normal position, and remains in such position during the remainder of the revolution of the cam-disk 4.

Considering now all movements of the needle, and referring particularly to Figs. 30 and 32 and to the previous description of the general operation of the machine, it will be seen that starting from the herein-indicated normal position of the parts, the needle rises while the shifting-plate is at rest, and when the needle has almoft reached its uppermost position (in order that the work may be supported near the base of the needle and the needle thus relieved of strain during the feeding movement) the shifting-plate moves forwardly, the needle remaining in its uppermost position during substantially the time occupied by this forward shifting movement of the plate 54. It is of course during this shifting movement that the work is fed, and it is during this period of elevation of the needle that the thread-laying devices lay the thread across the needle. The necessary feed having been effected, the shifting or feed plate 54 remains in its forward position and the needle descends, the shifting-plate commencing to return to normal position during such descent of the needle and after the needle has backed out of the work in order to return the needle to the horizontal position in which it starts its cycle of movements. The needle then rises slightly in order to permit the loop to be placed upon the loop take-off, whereupon the needle descends to lowermost position (as the loop take-off carries the loop away from the needle) and then rests, the backward shifting of the needle having been completed before the needle completes its downward movement.

We have provided means for regulating the feed of the needle, and thus regulating the length of the stitch, and this means will now be described. The groove 67 in the rock-arm 68 extends across the center of oscillation of the rock-shaft 69. It will therefore be apparent that the amount of throw of the shifting-plate 54 is controlled by the position of the block 66 in the said groove, the maximum throw being given the plate when the said block is at the point farthest removed from the center of oscillation of the rock-shaft, and the said shifting-plate having no movement should the said block be thrown into position substantially coincident with the center of oscillation of the rock-shaft. Many means can be provided for locking the arm 65 in adjusted positions, and we have here shown the said arm elongated to extend upon the side of its pivotal point opposite that upon which the block 66 is located, such extension being marked 73. A spring-actuated locking-dog 74 is slidably supported upon the said extension 73 and coöperates with any of a series of locking-notches 75, formed upon a segmental portion 76 of the shifting-plate 54.

*The loop take-off, the loop-spreader, and their operative connections.*—Supported upon the under side of the work-table C and adapted to reciprocate in the line of feed is a plate 77, having depending legs or extensions 78, and connected to said plate and depending from the same is an arm 79, which supports a horizontal finger, said finger being the above-mentioned loop-enterer and loop take-off or carrier J. This finger lies in line with the needle-opening 80 in the work-table and has its forward end pointed, as shown at 81, there being a vertical slot 82 through the said finger and the under surface of said finger at a suitable point between the ends of said slot being notched, as shown at 83. A suitably-journaled rotatable shaft 84 carries a cam-arm or tappet 85, which lies intermediate the said legs 78, and a spring 86, connected to the supporting-standard and bearing against the forward end of the slidable plate 77, is preferably employed for returning the said plate to its normal or backward position and yieldingly holding said plate in such position. Supported in suitable guides in the said plate 77 and upon the under side of the said plate is a horizontally-slidable plate 87, which has reciprocation in a line at right angles to that in which the plate 77 reciprocates, the plate 77 being preferably provided with lateral wings or extensions for giving a firm support to the slide-plate 87, so that said plate 77 presents the general appearance of a cross. Secured to the said plate 87 is the loop-spreader K, which comprises a horizontal finger 88, lying above and substantially in line with the finger J, the end of said finger of the loop-spreader being preferably pointed, as shown at 89, and the inner edge of said finger 88 being preferably provided with a thread-receiving notch 90.

Suitably journaled, as upon the before-mentioned rock-shaft 57, is a lever 91, which extends in a generally horizontal line at substantially right angles to the said rock-shaft 57, said lever being connected at its free end with the substantially horizontal arm 92 of a bell-crank lever 93, whose substantially vertical arm 94 is connected to the before-mentioned loop-spreader slide-plate 87, the said bell-crank lever lying in a vertical plane at substantially right angles to the horizontal plane, including the said plate 87, and in such position that its arm 94 reciprocates in substantially the line of reciprocation of the said plate. The connection between the said arm 94 of the bell-crank lever and the said plate 87 is effected through an elongated pin 95, which projects laterally from said vertical arm 94 and extends through an enlargement or sleeve 96 upon the under side of said plate 87. Upon a suitable horizontally-rotatable shaft parallel with the before-mentioned rock-shafts 57 and 69 (and here shown as the main shuttle-driving shaft 97) is a double tappet 98, which lies above and is adapted to strike and operate the lever 91, the tappet 98 being shown as a double one for the reason that it happens in the present machine to be upon a shaft which makes one revolution to each two cycles of operations of the stitch-forming devices. In the present organization the tappet or cam-arm 85 is upon the shaft 84, which makes two revolutions to each revolution of the said shaft 97, carrying the double tappet 98, said shaft 84 being driven in a manner to be hereinafter fully explained.

Referring now particularly to Figs. 3, 9, 12, and 13 and to the diagrams Figs. 22 to 26, when in normal positions the parts J and K lie as indicated in Figs. 9, 12, 13, and 22—*i. e.*, the fingers J and K lie horizontally and to one side of the line in which the loop will be formed as the needle descends, the pointed ends of said fingers lying toward the vertical line in which the loop will extend. After the needle has descended, and thus pulled the thread below the loop take-off J, the tappet 85 strikes the forward leg 78 and throws the slidable plate 77 forwardly in the line of feed, such forward movement of said plate causing the pointed end of the finger J to open the loop and also causing the loop-spreader K to enter the said loop. The said parts J and K come to rest with the slot 82 above and in line with the needle, the notches 83 above and in line with the loop, and the notch 90 in the side of the loop-spreader in line with the side of the loop which comes from the take-up. The pin 95 is of such length that the plate 77 is permitted to move into the position just indicated and to carry the plate 87 with it without breaking the connection between said plate 87 and the vertical arm 94 of the bell-crank lever. The parts having reached the positions indicated, the tappet 98 strikes the lever 91, whereupon the bell-crank lever 93 is rocked upon its pivot and the plate 87 is shifted in a line at right angles to that in which the plates 77 and 87 have previously moved, this shifting of the plate 87 causing the loop-spreader K to engage one thread of the loop (that coming directly from the take-off) and to thus spread the loop for the entrance of the point of the shuttle. Previous to the completion of this loop-spreading movement of the loop-spreader the needle has risen to carry its barb above the under surface of the loop take-off J, the needle entering the before-mentioned slot 82, so that as the loop-spreader spreads the loop the thread is drawn into the notches 83 of the loop take-off, the movements of the parts being such that the thread is not pulled across and in engagement with the barb of the needle. A spring 99, preferably acting upon either the bell-crank lever 93 or the lever 91, returns the plate 87, with its loop-spreader, to normal position, and the spring 86 returns the loop take-off J to normal position, the said take-off carrying the loop away from the needle during said return movement of said take-off and the needle descending to its lowermost position during said movement of the take-off.

By reason of the construction above indicated we are enabled to properly spread the loop without any danger of drawing the thread across the barb of the needle, and thus cutting or weakening the thread, and the loop is positively taken from the needle and presented to the shuttle. Furthermore, the parts J and K form a loop-spreading mechanism independent of the needle.

*The shuttle and its actuating mechanism.*—
The shuttle I comprises a generally circular member having a cut-away portion 100, by means of which the point 101 is produced, and there is also produced the wall or surface 102, adapted to be engaged by the hereinafter-mentioned driving-lugs. The shuttle is recessed, as shown at 103, for the purpose of receiving the bobbin 104, a plate 105 holding the bobbin in place in any suitable manner and being provided with an opening 106 for the passage of the bobbin-thread. The periphery of the shuttle is provided with a rib 107, adapted to operate in a groove 108, said groove being concentric with the shuttle and being conveniently produced by forming a shoulder 109 in the shuttle-supporting member and securing a guard-plate 110 to said supporting member in such manner that the groove 108 is formed between the said shoulder and the said guard member, the rib 107 lying between the said elements. Pivotally supported upon the standard is a plate 111, which is adapted to be thrown across a portion of the face of the plate 105, this locking-plate 111 being provided with a depression 112, in which is received an eccentric projection 113 upon the plate 105. Thus the bobbin is prevented from rotating with the shuttle. The locking-plate 111 is preferably yieldingly held in closed position, as by means of a spring 114.

Secured to the hereinbefore-mentioned shaft 84 is a driving-plate 115, upon whose outer surface are the before-mentioned driving-lugs 116, these lugs being adapted in the rotation of the driving-plate to engage the before-mentioned wall or surface 102 of the shuttle, and thus carry the shuttle with said driving-plate. The hereinbefore-mentioned rotatable shaft 97 is provided with a gear 117, and this gear is in driving connection with the gear 118 upon the shaft 84, such connection being conveniently effected through the intermediate gear 119. Therefore the rotation of the shuttle is controlled by the rotation of the driving-shaft 97, and as one of the driving-lugs 116 lies between the before-mentioned shuttle-wall 102 and the shuttle-point 101 said lug serves to prevent undesired movement of the shuttle after the driving-plate 115 has come to rest. There is sufficient space between the locking-plate 111 and the face of the shuttle and the face of the recess-closing plate 105 to permit the passage of the loop, and there is sufficient space between the driving-lugs 116 and the shuttle to permit the withdrawal of the loop by the take-up.

In order to cause the shuttle to be intermittently rotated, said shuttle being carried through a portion of a revolution in order to enter the loop, continuing through the revolution to carry the loop about the bobbin-thread, and then coming to rest in order to permit the loop-thread to be slowly drawn taut, the driving-shaft 97 is intermittently rotated in the manner to be now described, reference being had particularly to Figs. 3, 14, and 15 and the diagrams illustrated in Figs. 29 and 31. The driving-shaft 97 is provided with a non-circular portion 120, and loosely mounted upon the said shaft, as between one end of said non-circular portion and a suitable standard 121, is a gear 122, provided with a plate 123, having pin-receiving openings 124. Slidable upon said non-circular portion 120 is a clutch-sleeve 125, which has a peripheral recess 126 and is provided upon one side with pins 127, adapted to enter the before-mentioned openings 124 in the loose driving-gear, the other face of the said clutch-sleeve being provided with openings 128, adapted to receive pins 129, projecting from any relatively fixed portion of the machine. Preferably openings are bored entirely through the clutch-sleeve in both of the flanges upon the sides of the before-mentioned peripheral recess 120, said openings being in line with each other, whereby they can be readily produced, and the pins 127 are driven or otherwise secure in the openings upon the desired side of the clutch-sleeve. It is to be noted that the pins 127 and 129 are of such length that the clutch-sleeve is always in engagement with either the pins upon the relatively fixed support or the said driving-gear—the pins 129, for example, entering the openings 128 before the pins 127 leave the openings 124. Thus as the pins 129 are in fixed positions and by reason of the mechanism hereinafter described the driving-gear 122 always comes to rest in a given position, the clutch-sleeve when about to be shifted is always guided into the desired new position.

Suitably pivoted, as upon the stud 130, is a rocking plate 131, provided with a segmental gear 132, which meshes with the before-mentioned driving-gear 122, and pivoted upon the before-mentioned rock-shaft 30 is a lever 133, which is preferably connected to the said rocking plate by means of a link 134, said lever being provided with a cam-roll 135, which enters the cam-groove 136 in one face of the cam block or disk 5, this cam-groove being shown most clearly in Fig. 29.

Suitably pivoted, as upon the stud 136, is a lever 137, whose lower free end is provided with a yoke 138, the arms of said yoke being received in the before-mentioned peripheral groove 126 in the clutch-sleeve 125. Said lever 137 is provided with a cam-roll 139, which enters a cam-groove 140 in the periphery of the cam-disk 5, the said cam-groove being shown developed in Fig. 31. The segmental gear-plate 131 serves to impart rotary motion to the driving-gear 122, and the lever 137, with its yoke, of course controls the clutch-sleeve 125, by means of which said driving-gear 122 is operatively connected with the shaft 97.

Referring now more particularly to Figs. 29 and 31, it will be seen that when the parts are in what we have termed their "normal" positions, with the shuttle at rest, as shown in Fig. 9, rotation of the cam-disk 5 permits the segmental gear to remain at rest and also permits the clutch to remain at rest in the gear-engaging position shown in Fig. 15, the peripheral cam shown in Fig. 31 then causing the clutch to be thrown into unlocking position, although it and the shaft 97 are held against rotation by reason of the engagement of the clutch-sleeve by the stationary pins 129. After the clutch has been thrown into such open position it rests in said position, while the segmental-gear-operating cam causes said gear to be thrown backwardly in order to place the same in driving position, the gear 122 merely idly rotating upon the shaft 97 as said segmental gear is thrown into its said backward or what may be termed "operative" position. After the segmental gear has reached the said position and while the same is at rest the clutch-sleeve is thrown into closed position, engaging the driving-gear 122, thus locking said gear in driving connection with the said shaft 97, and soon after the clutch-sleeve has thus locked the driving-gear upon the said shaft the segmental gear-operating cam causes said gear to be thrown forwardly, and thus causes rotation of the shaft 97. From the time of the starting of the machine until this time, at which the segmental driving-gear commences its forward movement, the driving-shaft 97 has been at rest and has been locked in its position of rest by reason of the engagement of the clutch-sleeve with either the gear 122 when held against movement by the segmental driving-gear or the stationary pins 129. During about the last quarter of revolution of the cam-disk 5, however, and while the clutch-sleeve remains locked to the driving-gear 122 the shaft 97 is rotated. Consequently the shuttle is locked at rest from the time that the machine starts a cycle of revolutions until the segmental gear commences its forward or driving movement, the shuttle rotating during this period of driving movement of the segmental gear and moving through a complete revolution by reason of the proportions of the gears 117, 118, and 119 notwithstanding the fact that the shaft 97 may not be driven through a complete revolution.

*The take-up and its operative mechanism.*— The take-up L and its operative mechanism are most clearly shown in Figs. 17 and 18, and Fig. 34 shows a development of the cam which controls the operation of said take-up. The take-up is a substantially horizontal bar horizontally slidable upon the machine-standard and is provided at its forward end with a suitable thread guiding and engaging member, such as the roller 141, the upper thread passing over fixed thread-guides 142 above and below the roller-carrying end of the take-up, so that as said take-up moves backwardly the thread is pulled. The machine is preferably provided with a tension device 143, which can be of any convenient construction. Suitably pivoted upon the machine-standard is a lever 144, whose slotted free end receives a block 145, pivotally connected to the take-up bar, and said lever (or a rock-arm 146 upon a rock-shaft 147, to which the lever is fixed) is provided with a cam-roll 148, which enters a cam-groove 149 in the periphery of the cam-disk 4. This cam-groove is of such character that as the machine starts from the position which we have termed that of "rest" the take-up moves backwardly to its rearmost position, thus taking up the loop of the stitch last formed (except for the taking up of the loop) and measuring off sufficient thread for the next stitch. The take-up then rests in this rearmost position in order to afford opportunity for the needle to rise through the work and to reach the position in which it is to have the thread laid across it by the thread-laying devices. The take-up then moves forwardly through a portion of its whole length of movement in order to pay out sufficient thread for the formation of one side of the loop when said loop is in the lowermost position to which it is drawn by the needle, the thread thus given out by the take-up being stretched by the thread-laying devices. The take-up then rests in this partially-projected position until more thread is needed by reason of the pulling of the loop, when the take-up moves forwardly through the remaining portion of its whole amount of travel in order to permit the loop to be fully formed and carried around by the shuttle, when the take-up moves backwardly in order to draw the loop-thread taut, and thus complete the stitch. It is to be noted that the take-up not only serves to pull up the loop, but also serves to measure the thread necessary for the formation of a stitch and pays out the thread thus measured off in only such proportions and at such times as the said thread is needed.

We are aware that minor changes in the construction, arrangement, and combination of the several parts of our device can be made and substituted for those herein shown and described without in the least departing from the nature and principle of our invention.

Having thus described our invention, what we claim as new, and desire to secure by Letters Patent, is—

1. The combination with a loop-forming mechanism including a needle, of a loop take-off provided with means for holding the loop and thus carrying the loop with the take-off during movement of the latter, means for causing said take-off to enter the loop and then to recede, a complementary thread-engaging member, and means whereby, after said take-off has entered the loop and before the same has completed its receding movement, said complementary thread-engaging member moves the loop-thread into position to be held by and thus carried with the take-off during movement of the latter; substantially as described.

2. The combination with a loop-forming mechanism including a needle, of a loop take-off provided with means for holding the loop and thus carrying the loop with the take-off during movement of the latter, means for moving said take-off, a loop-spreader, and means for causing said loop-spreader to move the loop-thread into position to be held by and thus carried with the take-off during movement of the latter; substantially as described.

3. The combination with a loop-forming mechanism including a needle, of a loop take-off provided with means for holding the loop and thus carrying the loop with the take-off during movement of the latter, a loop-spreader, means for causing said take-off and spreader to advance and enter the loop, means for then causing said spreader to operate to move the loop-thread into position to be held by and thus carried with the take-off during movement of the latter, and means for then causing said take-off and spreader to recede; substantially as described.

4. The combination with loop-forming mechanism including a barbed needle, of a take-off having a loop-retaining surface, means for causing said parts to assume positions with the take-off intermediate the work and the end of the loop carried by said needle, means for causing the needle to move toward the work and to carry its barb into a position intermediate said work and the loop-receiving surface of the take-off, and means for then drawing said loop into engagement with the loop-retaining surface of the take-off; substantially as described.

5. The combination with loop-forming mechanism including a barbed needle, of a take-off having a loop-retaining surface, a loop-spreader, means for causing said parts to assume positions with the take-off intermediate the work and the end of the loop carried by said needle, means for causing said needle to move toward the work to carry its barbed end intermediate said work and the loop-retaining surface of the take-off, and means for then causing the spreader to move with relation to the take-off to spread the loop across and to place said loop upon the loop-retaining surface of said take-off; substantially as described.

6. The combination with loop-forming mechanism including a barbed needle, of a take-off having a loop-retaining surface, a loop-spreader, means for causing said parts to assume positions with the take-off intermediate the work and the end of the loop carried by said needle, means for causing said needle to move toward the work to carry its barbed end intermediate said work and the loop-retaining surface of the take-off, means for then causing the spreader to move with relation to said take-off to spread the loop across and place said loop upon the retaining-surface of said take-off, and means for then causing the take-off to move from the needle to carry the take-off-retained loop therefrom; substantially as described.

7. The combination with loop-forming mechanism including a barbed needle, of a take-off having a loop-retaining surface and provided with a needle-receiving slot opening upon said loop-retaining surface, means whereby said take-off and needle are caused to assume positions with the take-off intermediate the work and the end of the loop carried by said needle and with the said slot in line with said needle, and means for causing said needle to enter said slot and said take-off to take and retain the loop from the needle; substantially as described.

8. The combination with loop-forming mechanism including a barbed needle, of a loop take-off having a loop-retaining surface and provided with a slot opening upon said surface, there being a notch in said loop-retaining surface intermediate the ends of the said slot, means whereby said parts are caused to assume positions with the said take-off intermediate the work and the end of the loop carried by said needle and with the said slot in line with said needle and the said notch in line with the thread carried by said needle, and means for causing said needle to enter said slot, for causing the thread to be received in said notch and for causing said take-off to take the loop from the needle; substantially as described.

9. The combination with a loop take-off, a spreader, means for causing said parts to move forwardly into the loop and to recede from such forward position, and means for causing said spreader to move in a line at an angle to the line of the first herein-mentioned movement; substantially as described.

10. The combination with a movable support carrying a take-off, of a second support carried by said first-mentioned support and also having movement upon said first-mentioned support, and a loop-spreader carried by said second support; substantially as described.

11. The combination with a reciprocatory support carrying a take-off, of a second support carried by said first-mentioned support and having reciprocatory movement at an angle to the line of movement of said first-mentioned support, and a loop-spreader carried by said second support; substantially as described.

12. The combination with a reciprocatory support carrying a loop take-off, of a second support, carried by said first-mentioned support and having reciprocatory movement in a line at an angle to the line of movement of said first-mentioned support, a loop-spreader upon said second support, a movable element for moving said second support, and connection between said second support and said movable element and of such character that the connection between said parts is maintained in all positions of said first-mentioned support; substantially as described.

13. The combination with a reciprocatory support carrying a loop take-off, of a second support carried by said first-mentioned support and having reciprocatory movement in a line at an angle to the line of movement of said first-mentioned support, a loop-spreader upon said second support, a movable element for moving said second support, and an elongated pin forming the driving connection between said movable member and said second support and having engagement with one of said parts; substantially as described.

14. The combination with a work-table, of a support slidably supported thereon, a take-off carried by said support, a second support carried by said first-mentioned support and slidable with relation to the same at an angle to the line of movement of said first-mentioned support, and a spreader carried by said second support; substantially as described.

15. The combination with a work-table, of a support slidably supported thereon, a take-off carried by said support, a second support carried by said first-mentioned support and slidable with relation to the same at an angle to the line of movement of said first-mentioned support, a spreader carried by said second support, projections upon said first-mentioned support, a driving member intermediate said projections and adapted to coöperate therewith to move said first-mentioned support, and means for yieldingly holding said first-mentioned support in normal position; substantially as described.

16. The combination with complementary mechanism including shafts, of a slidable support carrying a spreader, a lever operatively connected to said support, a second lever pivoted upon one of said shafts and connected to said first-mentioned lever, means carried by another of said shafts for operating upon said second-mentioned lever to throw the same, and means for returning said second-mentioned lever to normal position; substantially as described.

17. The combination with a shuttle, a needle-bar, a shuttle-driving shaft, and a shaft for driving said needle-bar, of a movable support carrying a spreader, a lever connected to said movable support, a second lever pivoted upon said needle-bar-actuating shaft, connection between said second-mentioned lever and said first-mentioned lever, means upon said shuttle-driving shaft for engaging said second-mentioned lever, and means for returning the said second-mentioned lever to normal position; substantially as described.

18. The combination with a shuttle, a needle-bar, a shaft having driving connection with said shuttle, a second driving-shaft, driving connection between said second driving-shaft and said first-mentioned shaft, and a third shaft having operative connection with said needle-bar, of a movable support carrying a loop take-off and provided with projections, a member upon said first-mentioned shaft and intermediate said projections for engaging the same to move said support, means for yieldingly holding said support in normal position, a second support carried by said first-mentioned support and movable upon the same in a line at an angle to the line of movement of said first-mentioned support, a lever having sliding connection with said second-mentioned support, a second lever pivoted upon said needle-bar-actuating shaft, means upon said second-mentioned driving-shaft for engaging said second-mentioned lever for actuating the latter, and means for returning the said second-mentioned lever to normal position; substantially as described.

19. The combination with a barbed needle, of two pivotally-supported thread-engaging members each of which is by a single pivot pivoted to swing in a plane which intersects the line in which the needle moves and also to swing in a line from a point in advance of the barbed side of said needle to a point in rear of said barbed side, an actuating member, and connection between said actuating member and each of said thread-engaging members to swing them away from each other to lay the thread across the barbed side of said needle; substantially as described.

20. The combination with a needle, of pivotally-supported thread-engaging members, rock-plates provided with cam-slots, connection between said rock-plates and said thread-engaging members, and a movable actuating member having parts entering both said slots; substantially as described.

21. The combination with movable thread-engaging members, of rock-plates connected to said members, a rock-arm, said rock-plates being provided with slots having portions concentric with the axis of rotation of said arm and other portions eccentric to said axis of rotation, and members upon said rock-arm entering said slots; substantially as described.

22. The combination with a work-piercing tool-bar, and a stitch-indenting tool-bar, of means for reciprocating said work-piercing tool-bar, means for actuating said stitch-indenting tool-bar from said work-piercing tool-bar, and means whereby in the movement of said bars toward the work said work-piercing tool-bar has movement independent of said stitch-indenting tool-bar after said stitch-indenting tool-bar comes to rest upon the work; substantially as described.

23. The combination with a work-piercing tool-bar, and a stitch-indenting tool-bar, of means for reciprocating said work-piercing tool-bar, independent means for returning said stitch-indenting tool-bar to the work, a member connected to said stitch-indenting tool-bar, and a member upon said work-piercing tool-bar adapted to engage said member upon said stitch-indenting tool-bar in the movement of said work-piercing tool-bar from the work, said member upon said work-piercing tool-bar being freely movable away from said member upon said stitch-indenting tool-bar in the movement of said work-piercing tool-bar toward the work; substantially as described.

24. The combination with a work-piercing tool-bar, and a stitch-indenting tool-bar, of means for reciprocating said work-piercing tool-bar, a plate secured to said stitch-indenting tool-bar and having an opening through which said work-piercing tool-bar is movable, means independent of said work-piercing-tool-bar-reciprocating means for returning said stitch-indenting tool-bar to the work, and a part upon said work-piercing tool-bar and adapted to engage said plate in the movement of said work-piercing tool-bar from the work; substantially as described.

25. The combination with thread-laying devices and an awl-bar, of rock-plates connected to said thread-laying devices and provided with cam-slots, a rock-arm, projections upon said rock-arm entering said slots, and actuating connection between said rock-arm and said awl-bar; substantially as described.

26. The combination with thread-laying mechanism, an awl-bar and a presser-bar, of rock-plates provided with cam-slots, connection between said rock-plates and said thread-laying mechanism, a lifting-bar upon said presser-bar, a rock-arm, connection between said rock-arm and said awl-bar, projections upon said rock-arm and entering the slots of said rock-plates, and a member upon said rock-arm and adapted to engage under said lifting-bar during the upward movement of said rock-arm; substantially as described.

In testimony whereof we hereunto affix our signatures, in the presence of two witnesses, this 30th day of January, 1903.

GEORGE L. CORCORAN.
   GEORGE A. DOBYNE.

Witnesses:
 GALES P. MOORE,
 GEORGE BAKEWELL.